Aug. 12, 1969 G. A. KENT ET AL 3,461,233
TELEVISION VIDEO DETECTOR CIRCUIT
Filed Aug. 22, 1966
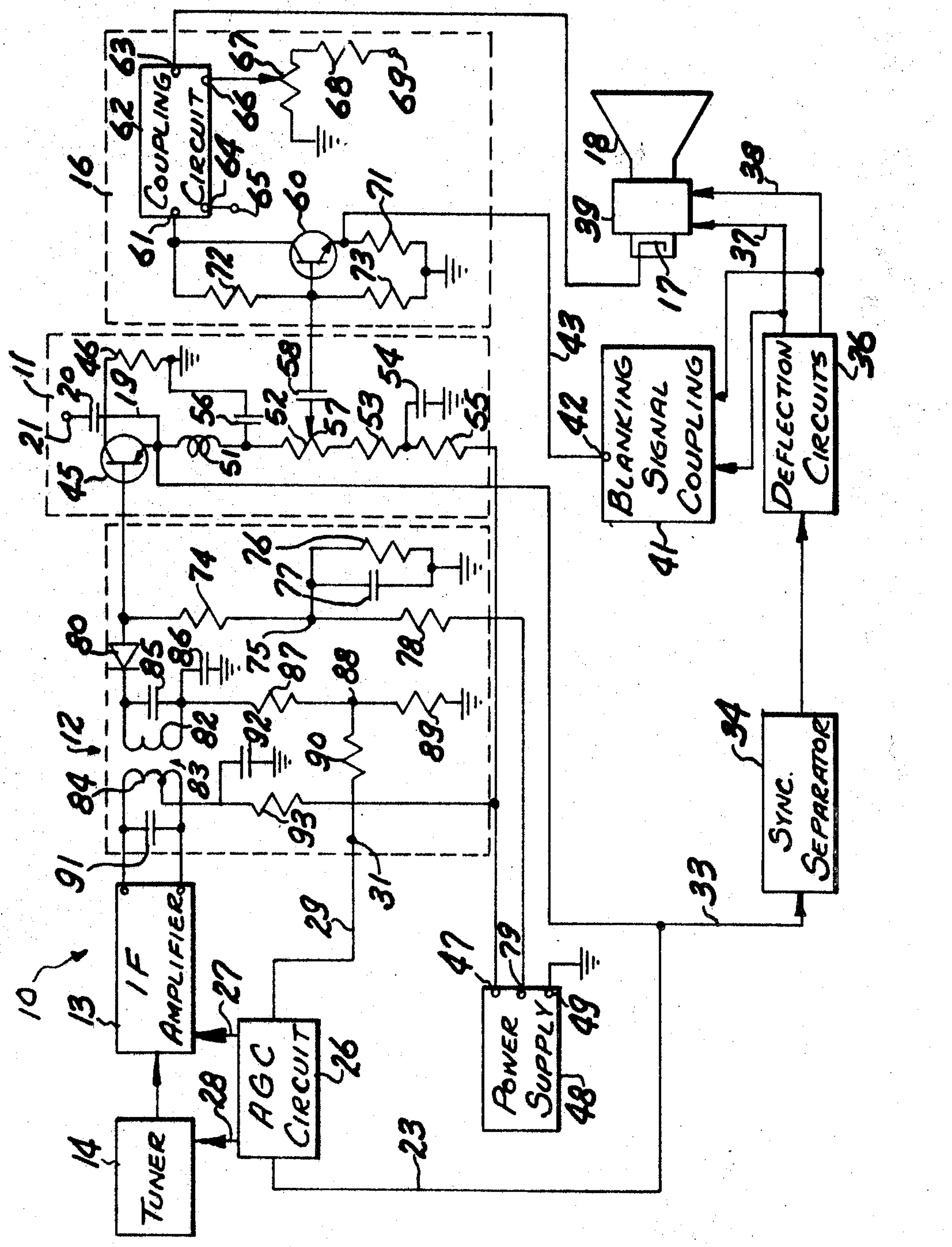
INVENTOR
George A. Kent
BY Richard J. Waring
Pendleton, Neuman, Seibold & Williams
Attorneys United States Patent Office
3,461,233
Patented Aug. 12, 1969

3,461,233

TELEVISION VIDEO DETECTOR CIRCUIT

George A. Kent, Fort Wayne, and Richard J. Waring, Auburn, Ind., assignors to The Magnavox Company, Fort Wayne, Ind., a corporation of Delaware Filed Aug. 22, 1966, Ser. No. 574,070
Int. Cl. H04n 3/16, 5/38
U.S. Cl. 178—7.3 8 Claims

ABSTRACT OF THE DISCLOSURE

The circuit minimizes white clipping over a wide range of received signal strengths by applying a forward bias to the detector diode with two components, one of relatively fixed magnitude dependent on the voltage at the base of the video driver transistor and one with variable magnitude dependent on a level produced by the automatic gain control circuit.

This invention relates to a television receiver video circuit, and more particularly to a video detector circuit which is effective to produce a signal having minimum distortions while being highly reliable, having a mnimum number of parts and being easily and inexpensively manufactured. The detector circuit is operative to minimize white clipping, a common problem in transistorized television receivers, and to produce a detected signal with greater fidelity than has been attained heretofore.

In conventional television receiver circuits, a received signal in the form of an RF signal, modulated by a video signal and by a subcarrier which is modulated by an audio signal is converted to an IF signal which is amplified and applied to a video detector. The video detector operates to demodulate the modulated signal to develop a video signal and also to develop an audio-modulated subcarrier signal. The video signal developed by the video detector is applied to a video driver amplifier and then to an electron gun structure of the picture tube to control the brightness of the scanning spot produced on the picture tube screen. The signal from the video detector is also applied to a synchronizing signal separator circuit which develops signals applied to deflection circuitry to control the deflection of the electron beam in synchronism with horizontal and vertical synchronizing components of the video signal. The output of the detector circuit is also generally applied to an automatic gain control circuit which supplies a control voltage to variable-gain amplifier stages to maintain the amplitude of the video signal substantially constant. The output of the detector is additionally applied to a sound IF amplifier, operative to apply the audio-modulated subcarrier to a detector circuit which functions to develop an audio signal which is amplified and applied to a sound reproducer.

It has been found that with prior circuits, distortions are produced in the rectification of the video signal from the IF amplifier and in the application of the rectified signal to the video amplifier, especially when the video amplifier is transistorized. It has also been found that such distortions can be reduced by maintaining a forward bias on a transistor of the video amplifier and a forward bias on the rectifying device of the video detector. If the forward bias on the detector rectifying device is too large or too small relative to the strength of the received signal, however, a phenomenon which may be referred to as white clipping occurs at the output of the detector device, and this phenomenon has persistently occurred in regard to solid state television.

The phenomenon referred to herein as white clipping is a loss of information from received video signals which results in a clipped output from the video detector and a whitening and blurring of the low amplitude images, which are the brighter images on the screen. When a signal is received by the detector, a back bias builds up on the detector rectifying device, which bias causes a decrease in response of the device and a total failure of response to very low amplitude signals. The decrease in response results in a general brightening of the picture produced and a total whitening of light gray images. Such loss of information by the detector and the consequent loss of image on the television screen is obviously an undesirable effect.

The present invention was evolved with the general object of overcoming the disadvantages of prior circuits and of providing a greatly improved receiver circuit to effectively eliminate white clipping.

A further object of the invention is to provide a relatively simple and inexpensive television receiver circuit which achieves a minimum of white clipping and a stable, reliable, and faithful reproduction of the video images.

An important feature of the invention is in the provision of an improved television receiver circuit wherein a biasing signal is applied to a video detector in a manner such as to effectively eliminate white clipping of the detected video signal.

In accordance with a specific feature of the invention a forward bias is applied to the rectifying device of the detector circuit which varies with the effective strength of the carrier of the received signal.

A further important feature of the invention is in the provision of a circuit wherein a biasing current flows through a video amplifier transistor and also through the rectifying device of the video detector in a manner to obtain optimum operation over a wide range of operating conditions.

A still further feature of the invention is in the manner of controlling the bias on the detector rectifying device, whereby the bias is controlled by an output voltage from the automatic gain control of the television receiver circuit.

This invention contemplates other and more specific objects, features and advantages which will become more fully apparent from the following detailed description taken in conjunction with the accompanying drawing which illustrates a preferred embodiment and in which the single figure is a schematic diagram of a television receiver constructed in accordance with the principles of this invention.

Reference numeral 10 generally designates a television receiver circuit constructed according to the principles of this invention. In general, the receiver 10 comprises a video driver circuit 11 to which a video signal is applied from a video detector circuit 12 which is supplied with a modulated signal through an IF amplifier 13 from a conventional tuner 14.

The video driver circuit 11 supplies an output signal through a video output stage 16 to a cathode 17, which forms a part of the electron gun structure of a picture tube 18. The cathode signal controls the brightness of a scanning spot in accordance with the instantaneous amplitude of the video signal. An output signal from the video driver circuit 11 is applied through a line 19 and a coupling capacitor 20 to an output terminal 21, which may be connected to a sound reproduction system, not shown in FIGURE 1.

An output signal from the video driver circuit 11 is also applied through a line 23 to an automatic gain control circuit 26, which operates to supply control voltages through lines 27 and 28 to the IF amplifier 13 and the tuner 14 respectively, to maintain automatically the amplitude of the detected video signal substantially constant. According to a specific feature of the invention, the automatic gain control circuit 26 also supplies a control voltage through a line 29 to the terminal point 31 of the video detector circuit 12.

The output of the video driver circuit 11 is also connected through line 33 to a synchronizing signal separator circuit 34 which receives signals from video driver circuit 11 and applies a signal to a deflection circuit 36, which operates to supply horizontal and vertical sweep signals through lines 37 and 38 to a deflection coil assembly 39 of the picture tube 18.

A blanking signal coupling circuit 41 may be provided having input terminals connected to the lines 37 and 38 and having an output terminal 42 connected through a line 43 to the video output stage 16. The blanking signal coupling circuit 41 and the other circuits and circuit elements shown in block form in FIGURE 1 are not, by themselves, a part of the present invention, but are incorporated in a complete receiver constructed according to the invention and are shown for the sake of completeness. They are either available in published information or can be constructed using conventional circuitry, and are, therefore, not illustrated in detail.

The video driver circuit 11 comprises a transistor 45, which is operated as an emitter-follower to present a relatively high impedance to the detector circuit 12 while having a relatively low output impedance so as to make it possible to couple directly the output signal to the video output stage 16, the automatic gain control circuit 26, the synchronizing signal separator circuit 34, and the sound reproduction system. The collector of the transistor 45 is connected through a resistor 46 to ground, while the emitter thereof is connected through load impedance means to an output terminal 47 of a power supply 48 having a second output terminal 49 connected to ground. The load impedance means comprises an inductor 51 connected between the emitter of transistor 45 and one end of a contrast-control potentiometer 52, the other end of which is connected through a resistor 53 and a capacitor 54 to ground and through resistor 53 and a resistor 55 to the power supply terminal 47. The capacitor 54 and resistor 55 operate as a decoupling filter. The junction between the inductor 51 and the potentiometer 52 is connected to ground through a capacitor 56 which cooperates with the inductor 51 in removing IF frequency components.

A movable contact 57 of the potentiometer 52 is connected through a capacitor 58 to the base electrode of a transistor 60 in the video output circuit 16. The collector of transistor 60 is connected to a terminal 61 of a coupling circuit 62 having a second terminal 63 which is connected to the cathode 17 of the picture tube 18. A third terminal 64 is connected to a terminal 65 which is connected to a power supply for application of a supply voltage to the transistor 60. A fourth terminal 66 is connected to the movable contact of a potentiometer 67 having one terminal connected to ground and having a second terminal connected through a resistor 68 to a terminal 69, to which a voltage is applied from a power supply. The potentiometer 67 controls the level of DC voltage at the cathode 17 of the picture tube 18 and thereby controls the brightness of the picture. The emitter of transistor 60 is connected through a resistor 71 to ground and is also connected directly to the line 43 from the blanking signal coupling circuit 41. Retrace pulse portions of the horizontal and vertical deflection signals are applied on the line 43, to cut off the transistor 60 and to blank the picture tube 18. To provide proper bias for the transistor 60, the base thereof is connected through a resistor 72 to the collector thereof and is connected through a resistor 73 to ground.

An important feature of the illustrated circuit is in the provision of a direct coupling arrangement between the driver stage 11 and the detector 12. In particular, the base electrode of video driver transistor 45 is connected through a resistor 74 to a circuit point 75 which is connected through a resistor 76 and a capacitor 77 to the ground and through a resistor 78 to a third output terminal 79 of the power supply 48. The base electrode of transistor 45 is also connected directly to one terminal of a diode 80 in the detector circuit 12, the other terminal of which is connected to one terminal of a secondary winding 82 of a transformer 83 having a primary winding 84. A capacitor 85 is connected in parallel with the secondary winding 82, the other terminal of which is connected through a capacitor 86 to ground and through a resistor 87 to a circuit point 88. Circuit point 88 is connected through a resistor 89 to ground and through a resistor 90 to terminal point 31. A capacitor 91 is connected across the primary winding 84 of transformer 83, and a tap on primary winding 84 may be connected through a capacitor 92 to ground and through a resistor 93 to the power supply terminal 47, to supply operating voltage for a transistor of the IF amplifier 13, not shown. Capacitors 85 and 91 operate in parallel with the windings 82 and 84 to tune the same to resonance at the IF frequency. The video detector circuit 12 operates to rectify the video signal, diode 80 being effective to demodulate the modulated signal which is induced in the secondary winding 82, to produce a negative-going video signal at the base of the driver transistor 45 in proportion to the amplitude of the incoming video signal on the primary winding 84.

According to another important feature of the invention, an operating bias for the driver transistor 45 is provided by the connection of circuit point 75 through resistor 78 to terminal 79 of the power supply 48. A forward bias is also established on diode 80, as a portion of the transistor 45 biasing current flows through diode 80 and secondary 82. It is important, however, that the bias on diode 80 be at a proper level relative to the strength of the received video signal, for otherwise the output of detector 12 will be distorted or clipped in the white portion of the signal. The embodiment of the present invention shown in the drawing is designed to insure the proper biasing of detector diode 80 for the prevention of white clipping.

It will be noted that in the illustrated circuit, a series circuit is provided which includes the secondary winding 82, the diode 80 and the resistor 74 which forms a detector load impedance, with a biasing voltage being applied across a portion of the series circuit. The base-emitter circuit of the transistor 45 is effectively connected in parallel with the load resistor 74.

To optimize the operation of the detector circuit at all signal levels, the biasing voltage is referenced to the AGC voltage from AGC circuit 26, which is a negative voltage proportional to the strength of the received video signal. The diode biasing current in the circuit is the sum of two currents, one having a value fixed by the DC voltage appearing at the base of the video driver transistor 45 and the total resistance to ground, and the other having a value which varies with the difference between the AGC voltage at terminal point 31 and the voltage on the base of transistor 45. Resistors 87, 89 and 90 can be chosen in conjunction with the AGC voltage swing to provide the proper value of current through diode 80 at any signal level and to eliminate white clipping of the video occurring at the output of the detector circuit 12. White clipping at low signal levels is the result of diode nonlinearity and the like, and is eliminated by forward biasing the detector diode. By automatically increasing the diode bias for increasing signal strength, white clipping is also avoided at higher signal levels.

It has been experimentally determined that the optimum average diode forward or biasing current under very weak signal conditions is approximately 85 microamperes for the detector circuit shown in the drawing, when using a type 1N60 diode. The optimum current under strong signal conditions, other conditions remaining the same, is approximately 250 microamperes. Under weak signal conditions the AGC voltage is small and the current through diode 80 is approximately 85 microamperes. As the signal strength increases, the AGC voltage becomes increasingly more negative, thereby increasing the voltage drop between the base of transistor 45 and the terminal point 31, and increasing the biasing current through detector diode 80 in a manner which is desired to minimize white clipping. Utilizing the foregoing circuit it has been found that white clipping can be avoided over a wide range of input signals such as 0 to 500,000 microvolts.

It will be understood that modifications and variations may be effected without departing from the spirit and scope of the novel concepts of this invention.

We claim as our invention:

1. In a television receiver, a video detector circuit for responding to a modulated carrier signal to produce an output video signal, means for developing a biasing signal having a value dependent upon the effective strength of said carrier signal, and a coupling between said video detector circuit and said means for supplying said biasing signal to said video detector circuit to minimize clipping of the information content of small amplitude portions of said modulated carrier signal.

2. In a television receiver as defined in claim 1, said biasing signal applying means including a control circuit having an input coupled to the output of said detector circuit and having an output at which said biasing signal is developed.

3. In a television circuit as defined in claim 2, variable-gain amplifier means for supplying said modulated carrier signal to said detector circuit, and means applying an output signal from said control circuit to said variable-gain amplifier means.

4. In a television receiver as defined in claim 1, video signal amplifier means including a transistor having a base electrode, and means for applying said output video signal from said detector circuit to said base electrode.

5. In a television receiver as defined in claim 1, said video detector circuit including a transformer having a winding in which said modulated carrier signal is induced, a diode, a load circuit across which said output video signal is developed, means providing a series circuit including said winding, said diode and said load circuit, and means applying said biasing signal across a portion of said series circuit.

6. In a television receiver as defined in claim 5, said biasing signal having a value dependent upon the effective strength of said carrier signal and having a polarity such as to increase conduction of said diode in response to an increase in the effective strength of said carrier signal.

7. In a television receiver as defined in claim 6, video signal amplifier means including a transistor having base, emitter and collector electrodes, means coupling said base and emitter electrodes to said load circuit to increase conduction of said transistor in response to an increase in the output signal produced across said load circuit.

8. In a television receiver for receiving a carrier signal modulated by a video signal, the modulated carrier signal having a maximum amplitude during synchronizing pulse components of the video signal and having a minimum amplitude during portions of the video signal corresponding to maximum white portions of a transmitted picture, a tuner for converting the received modulated carrier signal to an IF signal, an IF amplifier for amplifying said IF signal, a video detector circuit responsive to the amplified IF signal to produce a video output signal, a video signal amplifier for amplifying said video output signal, and reproducing means having a screen for producing a picture in response to the amplified video output signal, an automatic gain control circuit coupled to the output of said detector circuit for developing a control signal having an amplitude proportional to the effective strength of the carrier portion of said amplified IF signal, means applying said control signal to said IF amplifier to control the gain thereof, and means for applying said control signal to said detector circuit to so bias said detector circuit as to minimize clipping of portions of said output video signal corresponding to white portions of the transmitted picture.

References Cited

FOREIGN PATENTS 134,720 1961 U.S.S.R.

OTHER REFERENCES

Towers, Transistor Television Receivers, pp. 73–74, 1963.

ROBERT L. GRIFFIN, Primary Examiner

ROBERT L. RICHARDSON, Assistant Examiner

U.S. Cl. X.R.

325—409; 329—179